United States Patent
Futschik et al.

[11] Patent Number: 5,924,333
[45] Date of Patent: Jul. 20, 1999

[54] COVER PLATE FOR THE OPENING OF A SHIFT ASSEMBLY COVER OF AN AUTOMATIC TRANSMISSION OF A MOTOR VEHICLE

[75] Inventors: Hans-Dieter Futschik, Gechingen; Ulrich Nienhaus, Nagold; Norbert Weber, Bondorf, all of Germany

[73] Assignee: Daimler-Benz Aktiengesellschaft, Stuttgart, Germany

[21] Appl. No.: 08/948,657

[22] Filed: Oct. 10, 1997

[30] Foreign Application Priority Data

Oct. 10, 1996 [DE] Germany .......................... 196 41 705

[51] Int. Cl.⁶ .................................................. B60K 20/00
[52] U.S. Cl. ........................ 74/566; 74/473.36; 180/336
[58] Field of Search ................... 74/566, 473.36, 74/473.1, FOR 100, 18, 18.1, 18.2; 180/336

[56] References Cited

U.S. PATENT DOCUMENTS

| | | | |
|---|---|---|---|
| 4,630,499 | 12/1986 | Hopkins | 74/566 |
| 5,044,221 | 9/1991 | Suzuki et al. | 74/475 |
| 5,272,931 | 12/1993 | Daniel | 74/473.1 |
| 5,335,751 | 8/1994 | Kuroki | 180/336 |
| 5,582,073 | 12/1996 | Takeuchi et al. | 74/475 |
| 5,768,944 | 6/1998 | Inuzuka et al. | 74/473.1 |

FOREIGN PATENT DOCUMENTS

| | | | |
|---|---|---|---|
| 0 698 755 | 2/1996 | European Pat. Off. | |
| 195 35 825 | 3/1996 | Germany. | |
| 0134332 | 8/1982 | Japan | 180/336 |
| 0009334 | 1/1986 | Japan | 180/336 |
| 406072178 | 3/1994 | Japan | 180/336 |
| 07315069 | 12/1995 | Japan. | |

Primary Examiner—John A. Jeffery
Assistant Examiner—Chong H. Kim
Attorney, Agent, or Firm—Evenson, McKeown, Edwards & Lenahan, P.L.L.C.

[57] ABSTRACT

A cover plate for the opening of a shift assembly covering with a gate in this plate for receiving a selector lever of an automatic transmission of a motor vehicle, the selector lever to be moved in the plate on a shift assembly. The cover plate must always be closed with separate mounting of the plate and the covering despite necessary compensating dimensional tolerances, that in arrangements of these two parts within the entire tolerance range, no visually disturbing impression is created. A cover plate permanently connected with the shift assembly covers the edge area of the opening of the covering with play over a covering area that takes into account the dimensional tolerances between the installation positions of the covering and the shift assembly.

13 Claims, 2 Drawing Sheets

COVER PLATE FOR THE OPENING OF A SHIFT ASSEMBLY COVER OF AN AUTOMATIC TRANSMISSION OF A MOTOR VEHICLE

BACKGROUND AND SUMMARY OF THE INVENTION

This application claims the priority of German patent application number 196 41 705.8, the disclosure of which is expressly incorporated by reference herein.

The invention relates to a cover plate for the opening of a shift assembly cover of an automatic transmission of a motor vehicle.

The selector lever of the automatic transmission is guided in the cover plate in a gate whose guide path must be aligned in synchronization with that of the guide for the selector lever in the shift assembly. Since the shift assembly and its cover, which for example is the center console of a vehicle, are mounted separately, tolerances must be compensated between the cover plate and the edge area of the opening of the shift assembly cover that is to be closed by the cover plate.

In a cover plate known from EP 0698755 A2, tolerances with respect to the shift assembly cover can be compensated in a horizontal direction.

There is a need for a cover plate which is additionally able to compensate tolerances in the vertical direction, in other words in the direction of the vertical axis of the vehicle. In addition, the design to be provided must be capable of being manufactured efficiently and economically as well as being visually attractive.

These and other needs have been met according to the present invention by providing a cover plate for an opening of a shift assembly cover in which an edge area of the opening is arched, the cover plate defining a gate opening for a gear selector lever of an automatic transmission of a motor vehicle which lever is mounted on the shift assembly and is movable in the gate, the cover plate being fixedly connected to the shift assembly and to the edge area of the opening of the shift assembly cover, the cover plate being arranged and configured to cover the opening and to compensate for dimensional tolerances between the shift assembly cover and the shift assembly, wherein the cover plate comprises a basic body having an arched peripheral edge and at least one insert arranged radially inwardly of the arched peripheral edge, the basic body being made of an elastic material and the insert being made of a material which is less elastic than the elastic material, the basic body being adjustably coupled to the shift assembly such that the cover plate is adjustable in a direction essentially perpendicular to a plane defined by the opening.

These and other needs have been also met according to the present invention by providing an arrangement for covering an opening in a motor vehicle shift assembly cover, comprising: a basic body including a rib to be coupled to a shift assembly and a peripheral edge to be abutted to an exterior surface of the shift assembly cover, the basic body being configured such that the rib extends through the opening in the shift assembly cover in an assembled position, the basic body being made of an elastic material; and at least one insert fixedly connected to an outer surface of the basic body, one of the inserts defining a gate opening for a shift lever, and an outer surface of the basic body and the at least one insert being convex.

These and other needs have been also met according to the present invention by providing a method for covering an opening in a motor vehicle shift assembly cover, comprising the steps of: forming a basic body including a rib and an outer peripheral surface from an elastic material; coupling the rib to a shift assembly and abutting an outer peripheral edge to an exterior surface of the shift assembly cover such that the rib extends through the opening in the shift assembly cover; fixedly connecting at least one insert to an outer surface of the basic body, one of the inserts defining a gate opening for a shift lever, and an outer surface of the basic body and the at least one insert being convex.

In a design of this kind, tolerances that can no longer be detected by the eye of approximately 2 to 3 mm in all directions between the cover plate and the shift assembly cover can be compensated without difficulty. The shift assembly cover in practice is a "floating" cover for covering the shift assembly, serving for example as the center console of an automatic transmission. The shift assembly, also referred to as a shift block, serves as the starting basis of the position of the cover plate as well as the shift assembly cover surrounding the latter. The cover plate must be permanently connected to the shift assembly, since a shift gate provided in the shift assembly for the selector lever must be aligned in synchronization with the gate in the cover plate. The gate in the cover plate must geometrically match the shape of the selector lever gate in the shift assembly. The variations in position between the opening in the shift assembly cover that serves as the center console and the position of the cover plate determined by the shift assembly are compensated by the design according to the invention in a simple and inconspicuous manner. It is advantageous in this regard to round off the edge of the cover plate with a radius in order thereby to create an inconspicuous shadow gap, possibly leaving local gaps, for larger gap widths between the cover plate and the shift assembly cover.

By virtue of the elastic material provided in the area of the arched edge of the cover plate, for example a relatively elastic plastic, as well as a surrounding insert made of a stiffer material, the edge of the cover plate can abut the supporting surface with a required pressure and provide reliable covering.

In order to permit sufficiently high deformability of the edge, a material constriction is provided between the arched edge and the area that adjoins the gate opening as well as possible additional openings in the cover plate, said area being formed as a relatively stiff frame. This material constriction can advantageously be made in the form of a film hinge.

Inserts in the arched edge of the cover plate that provide support are advantageously trim materials such as chrome, wood, or colored plastic parts for example. Inserts, especially for stiffening the cover plate in the circumferential area of the openings of the cover plate, can likewise be provided and advantageously are simultaneously trim parts made of the above materials.

The inserts to be provided in the arched edge of the cover plate can exert the pressure of the edge onto the supporting surface in the manner of a cup spring.

Other objects, advantages and novel features of the present invention will become apparent from the following detailed description of the invention when considered in conjunction with the accompanying drawings.

DETAILED DESCRIPTION OF THE DRAWINGS

Figure 1:
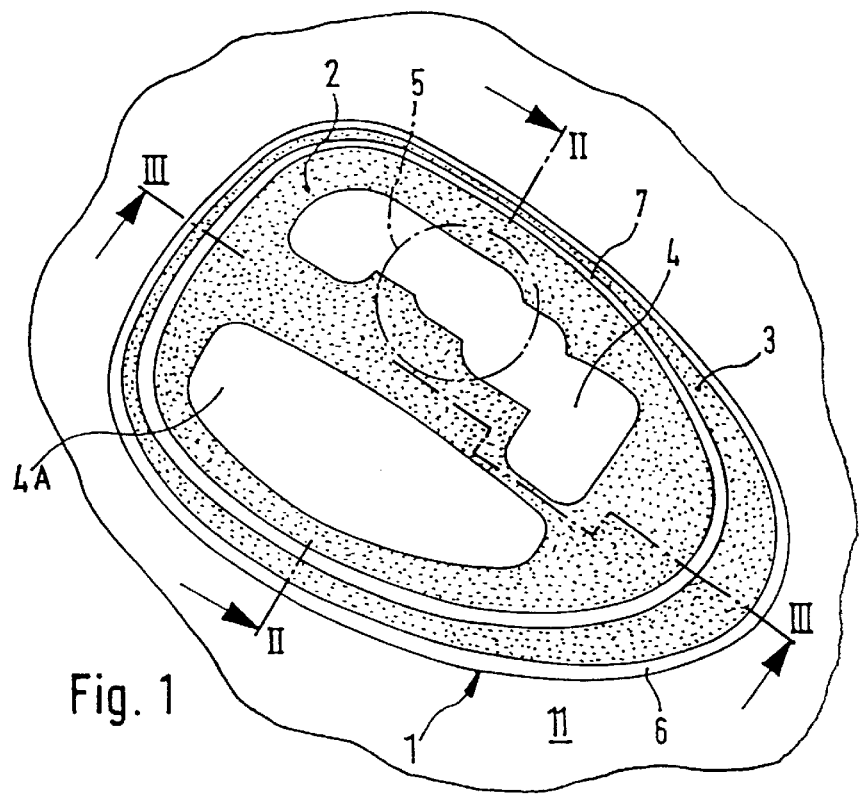
FIG. 1 is a perspective top view of cover plate with a shift gate for the selector lever of an automatic transmission of a motor vehicle according to a preferred embodiment of the present invention.
Figure 2:
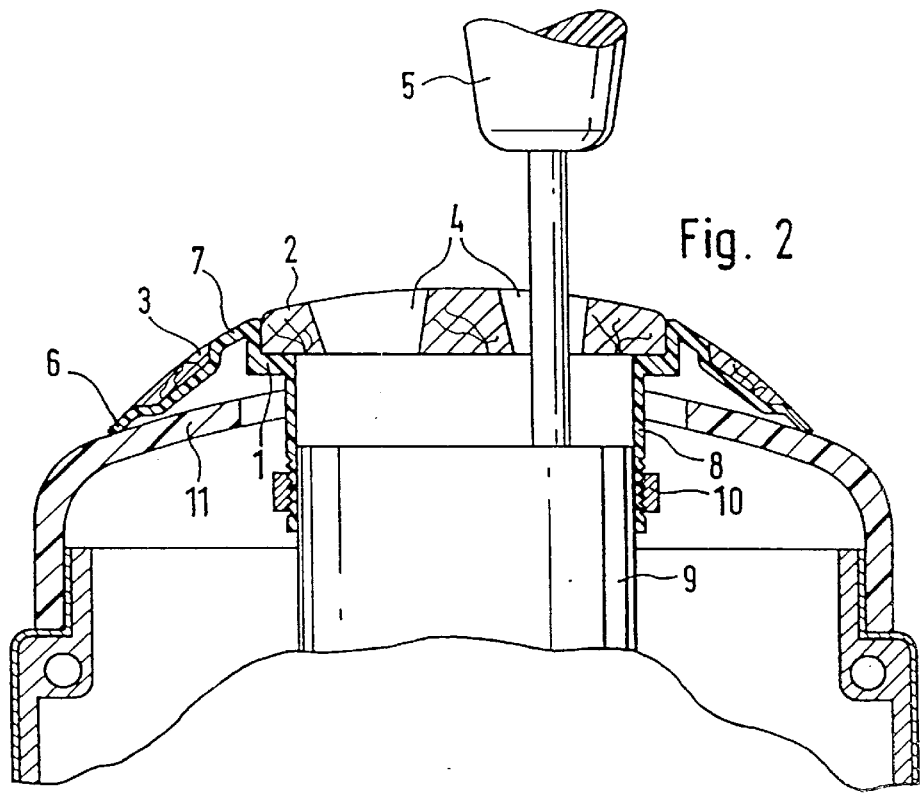
FIG. 2 is a section through the cover plate along line II—II in FIG. 1.

In the cover plate according to FIGS. 1 and 2, an opening in a cover 11 for a motor vehicle shift assembly 9 is covered by a cover plate which comprises a basic body 1 and decorative inserts 2, 3. The basic body 1 is made of a flexible material, for example plastic or any natural/synthetic elastic material. The decorative inserts 2, 3 are formed of a decorative material, for example wood. The decorative inserts 2 and 3 are fixedly connected with the basic body 1, and are formed of a material which is stiffer, i.e., less elastic, than the elastic material of the basic body. Decorative insert 2 defines a gate opening 4 for receiving a transmission selector lever 5, as well as an adjacent opening 4A for receiving a gear shift selector indicator.

An upper surface of the cover plate is arched all of the way around, with an arched peripheral supporting edge 6 being formed by the basic body 1. The flexible material of the basic body 1 allows the arched peripheral supporting edge 6 to compensate for tolerances relative to the shift assembly cover 11, particularly in a direction perpendicular to a plane defined by the opening in the cover (i.e., the vertical direction as shown in FIG. 2). The decorative insert 3 is located adjacent to and radially inward of the arched peripheral supporting edge 6. An intermediate portion 7 of the basic body 1 is interposed between the decorative insert 3 and the decorative insert 2. In this intermediate portion 7 the basic body material is constructed in the manner of a so-called film hinge, as shown in FIG. 2, providing a certain degree of flexibility at the interface between the arched peripheral supporting edge 6 and the shift assembly cover 11. As a result, the flexibility is limited while providing an application force for arched peripheral supporting edge 6.

As shown in FIG. 2, the cover plate is fastened via a rib 8 extending therefrom, to a shift assembly or shift block 9 that guides selector lever 5. The connection between ribs 8 and shift assembly 9 is a tensioned connection and is achieved by providing the end of rib 8 with a sawtooth profile to receive a clamp 10 which biases the rib 8 toward a frictional engagement with the shift assembly 9.

The cover plate rests via the arched peripheral supporting edge 6 on the shift assembly cover 11. The shift assembly cover 11 has a supporting area that faces the peripheral supporting edge 6 convexly in the lengthwise and transverse directions, said supporting area being unequally formed and arched outward. Due to the arched design of the edge area of the cover plate, its supporting edge area 6 can adapt to the shift assembly cover 11 even with tolerance between the set positions of the cover plate and shift assembly cover 11 with no gaps.

Decorations 2 and 3 can be made especially of precious wood or chrome or painted plastic parts. Decoration 3 can be a type of chrome, wood, or plastic ring by means of which in the manner of a cup spring effect a pressure force can be produced on the edge of the cover plate that is arched and operates in practice as a sealing lip.

Decorations 2 and 3 can be made interchangeable on basic body 1 in order thereby to produce cover plates that act or appear in different ways. In addition, the material of basic body 1 can have different colors and structures on the areas that are visible from the outside.

Figure 3:
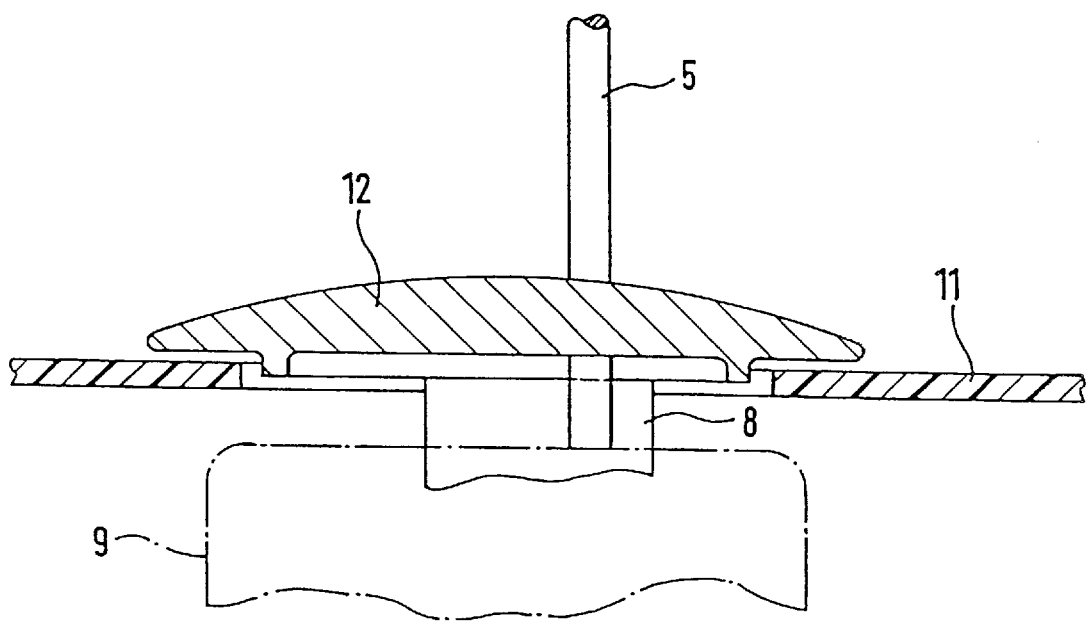
FIG. 3 is a section through the cover plate along line III—III in FIG. 1, with the cover plate being a compact one-piece part.

In the embodiment of the invention according to FIG. 3, the edge area of the opening of shift assembly cover 11, which is to be closed by a one-piece cover plate 12, is essentially flat. As a result, cover plate 12 in this case can be installed with dimensional tolerances such that it covers the opening edge area of the cover with play. The covering in all directions is such that compensation of any tolerances on the lever of up to approximately 3 mm is readily possible without being visible to the eye. The edge area of cover plate 12 according to FIG. 3 is given a radius in order thereby to produce a less visible shadow gap when cover plate 12 is installed with a vertical distance from shift assembly cover 11, in other words the center console of the vehicle. The one-piece cover plate 12 in the embodiment according to FIG. 3 replaces the one that is composed in the embodiment according to FIG. 1 of parts 1, 2, 3, and 6.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A cover plate for an opening of a shift assembly cover in which an edge area of the opening is arched, said cover plate defining a gate opening for a gear selector lever of an automatic transmission of a motor vehicle which lever is mounted on the shift assembly and is movable in the gate, said cover plate being fixedly connected to the shift assembly and to the edge area of the opening of the shift assembly cover, said cover plate being arranged and configured to cover said opening and to compensate for dimensional tolerances between the shift assembly cover and the shift assembly, wherein the cover plate comprises a basic body having an arched peripheral edge and at least one insert arranged radially inwardly of said arched peripheral edge, said basic body being made of an elastic material and said insert being made of a material which is less elastic than said elastic material, said basic body being adjustably coupled to the shift assembly such that said cover plate is adjustable in a direction essentially perpendicular to a plane defined by said opening.

2. A cover plate according to claim 1, wherein an intermediate portion of said basic body located radially inwardly of said arched peripheral edge is configured to matingly correspond to a peripheral edge of at least one of said at least one insert.

3. A cover plate according to claim 2, wherein said intermediate portion is configured as a film hinge.

4. A cover plate according to claim 1, wherein one of said at least one insert is located adjacent said arched peripheral edge and forms an outer surface of said cover plate.

5. A cover plate according to claim 1, said basic body is adjustably coupled to the shift assembly via a rib of said basic body.

6. A cover plate according to claim 5, wherein an intermediate portion of said basic body located between said rib and said peripheral edge is configured as a film hinge in order to allow movement of said peripheral edge relative to said rib in said direction.

7. An arrangement for covering an opening in a motor vehicle shift assembly cover for a shift assembly which is separate from said shift assembly cover, comprising:

a basic body including a rib to be coupled to said shift assembly and a peripheral edge to be abutted to an exterior surface of said shift assembly cover, said basic body being configured such that said rib extends through said opening in the shift assembly cover in an assembled position, said basic body being made of an elastic material;

at least one insert fixedly connected to an outer surface of said basic body, one of said at least one insert defining a gate opening for a shift lever, and said outer surface of said basic body being convex; and said basic body being adjustably coupled to the shift assembly such that said cover plate is adjustable in a direction essentially perpendicular to a plane defined by said opening.

8. An arrangement according to claim 7, wherein an intermediate portion of said basic body located between said rib and said peripheral edge is configured as a film hinge in order to allow movement of said peripheral edge relative to said rib in a direction perpendicular to a plane defined by said opening.

9. An arrangement according to claim 7, wherein one of said at least one insert is arranged adjacent said peripheral edge, and said at least one insert is made of a material which is less elastic than said elastic material.

10. A method for covering an opening in a motor vehicle shift assembly cover for a shift assembly which is separate from said shift assembly cover, comprising the steps of:

forming a basic body including a rib and an outer peripheral surface from an elastic material;

coupling said rib adjustably to said shift assembly such that said basic body is adjustable in a direction essentially perpendicular to a plane defined by said opening and abutting an outer peripheral edge to an exterior surface of said shift assembly cover such that said rib extends through said opening in the shift assembly cover;

fixedly connecting at least one insert to an outer surface of said basic body, one of said at least one insert defining a gate opening for a shift lever, and an outer surface of said basic body and said at least one insert being convex.

11. A method according to claim 10, further comprising configuring an intermediate portion of said basic body located between said rib and said peripheral edge as a film hinge in order to allow movement of said peripheral edge relative to said rib in a direction perpendicular to a plane defined by said opening.

12. A method according to claim 10, further comprising arranging one of said at least one insert adjacent said peripheral edge, said at least one insert being made of a material which is less elastic than said elastic material.

13. An arrangement according to claim 7, wherein an outer surface of said at least one insert is convex.

* * * * *